(12) United States Patent
Kim et al.

(10) Patent No.: US 8,310,971 B2
(45) Date of Patent: *Nov. 13, 2012

(54) METHOD OF SUPPORTING OPERATION OF SLEEP MODE IN A WIDEBAND RADIO ACCESS SYSTEM

(75) Inventors: Beom Joon Kim, Seoul (KR); Ki Seon Ryu, Seoul (KR); Chang Jae Lee, Seongnam-si (KR); Yong Ho Kim, Bucheon-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/333,784

(22) Filed: Dec. 21, 2011

(65) Prior Publication Data

US 2012/0087291 A1 Apr. 12, 2012

Related U.S. Application Data

(63) Continuation of application No. 13/013,742, filed on Jan. 25, 2011, now Pat. No. 8,145,279, which is a continuation of application No. 11/576,342, filed as application No. PCT/KR2005/003001 on Sep. 12, 2005, now Pat. No. 7,904,122.

(30) Foreign Application Priority Data

Sep. 30, 2004 (KR) ........................ 10-2004-0078044
Nov. 4, 2004 (KR) ........................ 10-2004-0089252

(51) Int. Cl.
*G08C 17/00* (2006.01)
(52) U.S. Cl. ........ 370/311; 370/318; 370/328; 455/574; 455/458; 455/515
(58) Field of Classification Search ........ 340/7.32–7.35, 340/7.42–7.46, 539.3; 370/331, 311; 375/354; 455/552.1, 572–574, 343.1–343.6, 436, 442
See application file for complete search history.

(56) References Cited

U.S. PATENT DOCUMENTS 7,130,668 B2 10/2006 Chang et al.
(Continued)

FOREIGN PATENT DOCUMENTS

EP 1511335 3/2005
(Continued)

OTHER PUBLICATIONS

Yoon, C., et al. "Enhancement on Sleep Mode Operation by Grouping", IEEE 802.16 Broadband Wireless Access Working Group, IEEE C802.16e-04/05r1, [online], Jan. 15, 2004 [retrieved on Jan. 16, 2007]. Retrieved from the Internet: URL:http://www.ieee802.org/16tge/contrib/C80216e-04_05r1, pdf.. Sections 1, 2, fig. 2.

(Continued)

*Primary Examiner* — Sharad Rampuria
(74) *Attorney, Agent, or Firm* — Lee, Hong, Degerman, Kang & Waimey (57) ABSTRACT

A method of indicating downlink traffic to a mobile subscriber station that is in a sleep mode includes transmitting a sleep request message to a base station (BS); entering the sleep mode in response to a sleep response message received from the BS, wherein the sleep response message includes a first SLPID; receiving a traffic indication message including a FMT field indicating formats for the traffic indication message from the BS during a listening interval of the sleep mode, wherein the FMT field indicates one of an SLPID bitmap based format and an SLPID based format, and the traffic indication message further includes a second SLPID when the SLPID based format is used; and terminating the sleep mode to receive the downlink traffic when the second SLPID in the traffic indication message is same as the first SLPID included in the sleep response message.

8 Claims, 7 Drawing Sheets

U.S. PATENT DOCUMENTS

| | | | |
|---|---|---|---|
| 7,194,288 B2 * | 3/2007 | Lee et al. | 455/574 |
| 7,450,926 B2 | 11/2008 | Chang et al. | |
| 7,522,553 B2 * | 4/2009 | Kang et al. | 370/328 |
| 7,986,949 B2 * | 7/2011 | Ryu et al. | 455/439 |
| 8,135,446 B2 * | 3/2012 | Ji | 455/574 |
| 2007/0242786 A1 | 10/2007 | Kim et al. | |
| 2009/0003255 A1 * | 1/2009 | Mohanty et al. | 370/311 |

FOREIGN PATENT DOCUMENTS

| | | |
|---|---|---|
| WO | 00/60811 | 10/2000 |
| WO | 2005/046085 | 5/2005 |

OTHER PUBLICATIONS

Kitroser, I. et al. "IEEE 802.16e Sleep Mode", IEEE 802.16 Broadband Wireless Access Working Group, IEEE C802.16e-03/15r1, [online], Mar. 11, 2003 [retrieved on Jan. 16, 2007]. Retrieved from the Internet: URL:http://www.ieee802.org/16/tge/contrib/C80216e-03_15r1.pdf>. Sections 1-3.

Tcha, Y. et al. Enhancement of the SLPID bit-map in the MOB-TRF-IND message in IEEE P802.16eN, IEEE 802.16 Broadband Wireless Access Working Group, IEEE C802.16e-041207, [online], Jun. 25, 2004 [retrieved on Jan. 16, 2007]. Retrieved from the Internet: CURL: http:/www.ieee802.org/16/tge/contrib.C80216e-04_207.pdf>. pp. 1, 4, 5.

Zhang, H. et al. "Enhancement to Normal Mode to Sleep Mode Transition—Harmonization Ad-hoc Consensus Contribution", IEEE 802.16 Broadband Wireless Access Working Group, IEEE C802.16e-04/271, [online], Aug. 17, 2004 [retrieved on Jan. 16, 2007]. Retrieved from the Internet: URL:http://www.ieee802.org/16/tge/contrib.C80216e-04_271.pdf>. Sections 1-3.

* cited by examiner

METHOD OF SUPPORTING OPERATION OF SLEEP MODE IN A WIDEBAND RADIO ACCESS SYSTEM

CROSS-REFERENCE TO RELATED APPLICATIONS

This application is a continuation of U.S. application Ser. No. 13/013,742, filed on Jan. 25, 2011, now U.S. Pat. No. 8,145,279,which is a continuation of U.S. application Ser. No. 11/576,342, filed on Mar. 29, 2007, now U.S. Pat. No. 7,904,122, which is a 371 U.S. national stage application of International Application No. PCT/KR2005/003001, filed on Sep. 12, 2005, which claims the benefit of earlier filing date and right of priority to Korean Patent Application Nos. 10-2004-0089252, filed on Nov. 4, 2004, and 10-2004-0078044, filed on Sep. 30, 2004, the contents of which are all hereby incorporated by reference herein in their entirety.

TECHNICAL FIELD

The present invention relates to a method of providing support to wideband radio access system, and more particularly, to a method of supporting operation of sleep mode in a wideband radio access system.

BACKGROUND ART

In a wideband radio access system, a mobile subscriber station (MSS) can enter sleep mode in order to minimize power consumption of the MSS. The MSS in sleep mode follows the operating schedule according to sleep interval which increases at a specified ratio. The sleep interval is comprised of listening window and sleep window.

The listening window is determined according to a sleep request message and a sleep response message. More specifically, the MSS transmits a request to a base station (BS) asking for permission to enter sleep mode. In response to the request, the BS transmits a response message granting the MSS to enter sleep mode.

The MSS enters sleep mode upon receiving the sleep response message from the BS. The MSS remains in sleep mode until it is time to check whether there is any downlink traffic, which has its address, during a listening window.

During the listening window period, a traffic indication (MOB-TRF-IND) message is broadcasted from the BS. From the traffic indication message, the MSS checks to determine whether there is any downlink traffic having its address.

During sleep mode, the MSS receives minimum number or amount of downlink signal(s) from the BS in order to save power. In addition, the MSS scans neighboring base stations for performing handover and performs ranging operation to maintain appropriate downlink coding type in order to maintain uplink transmission and signal quality.

The operation of sleep mode includes communication of medium access control (MAC) messages such as sleep request (MOB-SLP-REQ) message, sleep response (MOB-SLP-RSP) message, and traffic indication (MOB-TRF-IND) message(s).

Table 1 illustrates an example of a sleep request message which includes sizes of sleep window and listening window.

TABLE 1

| Syntax | Size (bits) | Notes |
|---|---|---|
| SLP-REQ Message Format ( ) { | | |
|    Management message type = 50 | 8 | |
|    initial sleep window | 6 | |
|    final sleep window | 10 | |
|    listening window | 4 | |
|    final sleep window exponent | 3 | |
|    N_sleep_CID | 8 | Number of Sleep CID |
|    For (i=0; i<N_Sleep_CID; i++{ | | |
|      Sleep_CID | 16 | |
|    } | | |
|    reserved | 1 | |
| } | | |

Table 2 illustrates an example of a sleep response message which includes information such as whether the request for sleep mode entry has been granted, sizes of sleep window and listening window, and sleep identification.

TABLE 2

| Syntax | Size (bits) | Notes |
|---|---|---|
| MOB-SLP-RSP Message Format( ) { | | |
|   Management message type = 51 | 8 | |
|   Sleep-approved | 1 | 0: Sleep Mode request denied<br>1: Sleep Mode request approved |
|   If (Sleep-approved = 0) { | | |
|     REQ-duration | 7 | Time duration |
|   } | | |
|   else { | | |
|     If (SHO or FBSS capability enabled) { | | If SHO or FBSS capability is enabled in the REG-REQ-RSP message exchange |
|       Maintain Active Set and Anchor BS ID | 1 | 1: Active set and Anchor BS ID is maintained while in sleep mode for SHO/FBSS duration<br>0: Active set and Anchor BS ID is not maintained while in sleep mode |
|     If (Active Set and Anchor BS ID maintained) { | | |
|       SHO/FBSS duration (5) | 3 | Active set and Anchor BS ID is maintained for $10 \times 2^s$ frames after entering sleep mode |
|     } | | |
|   } | | |
|   Start frame | 6 | |
|   initial sleep window | 6 | |
|   final sleep window | 10 | |
|   listening window | 4 | |
|   final sleep window exponent | 3 | |
|   SLPID | 10 | |
|   Sleep duration type/length/value (TLV) encoded information | 8 | In units of 20 ms frames |
|   } | | |
|   Padding | variable | To ensure octet-aligned |
| } | | |

Figure 1:
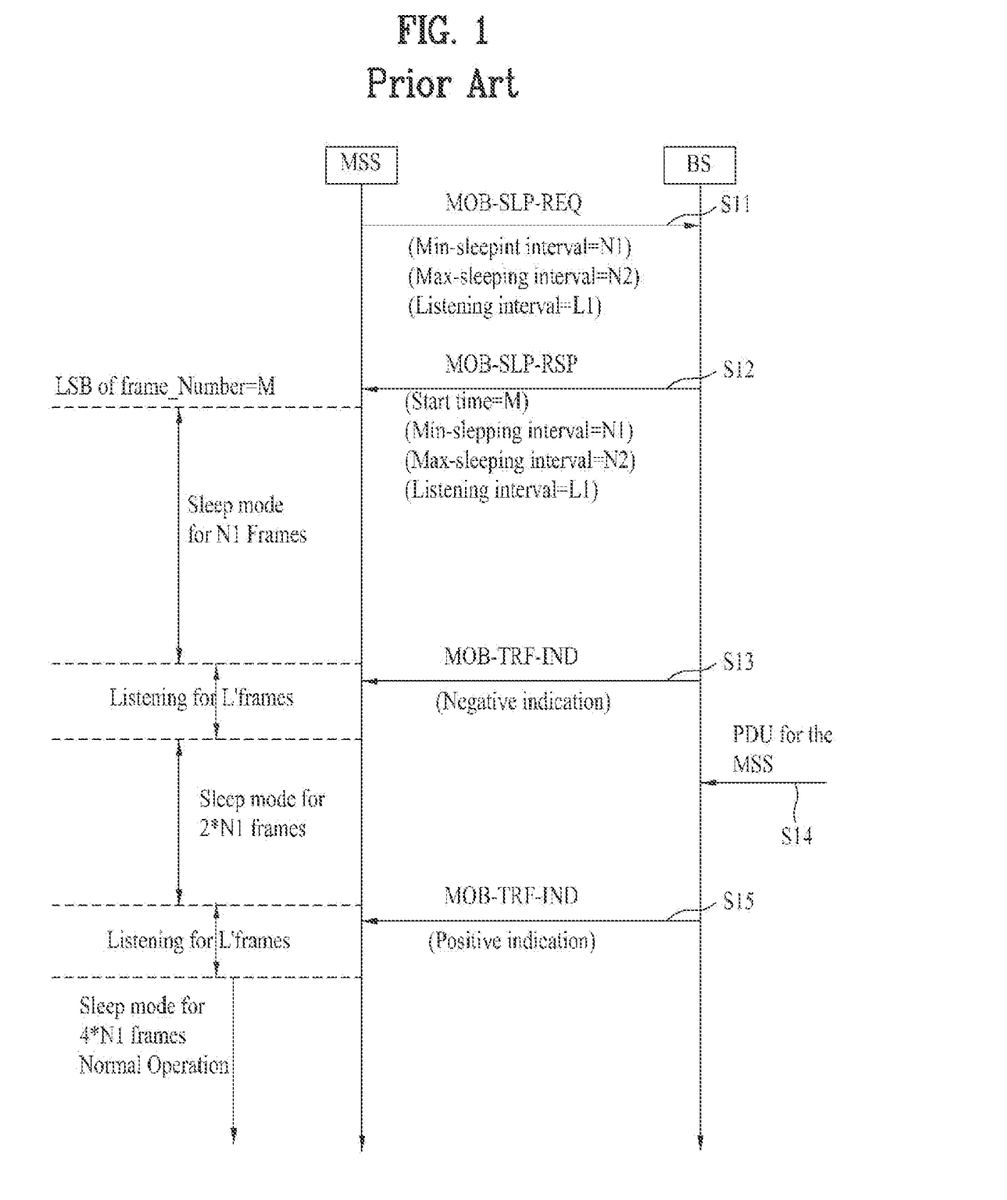
FIG. 1 illustrates an example of operation of the MSS in sleep mode.

As explained above, upon receipt of the sleep response message, the MSS enter sleep mode. An operation of the MSS in sleep mode is explained below. FIG. 1 illustrates an example of operation of the MSS in sleep mode. More specifically, FIG. 1 illustrates the MSS transmitting to the BS a request to enter sleep mode, and terminating sleep mode upon notice from the BS of downlink traffic to the MSS. The details of each operation are as follows.

The MSS includes in the sleep request message (See Table 1) information, such as an initial sleep interval (N1), final sleep interval (N2), and listening interval (L1), in the request to enter sleep mode and transmits sleep mode entry request to the BS (S11). In response, the BS determines the initial sleep interval (N1), final sleep interval (N2), listening interval (L1), and sleep mode start time (M), and transmit the sleep response message (See Table 2) including the determined information to the MSS, assuming the BS approves the sleep mode entry request (S12).

The MSS maintains sleep mode for initial sleep interval (N1) after entering sleep mode. After the initial sleep mode expires, the MSS receives a traffic indication message, which is broadcasted, during the listening interval (L1) (S13). If the MSS ascertains that there is no downlink traffic addressed to it, the MSS increases the sleep interval by two-folds from the initial sleep interval (2*N1).

More specifically, a subsequent sleep interval increases two-folds from the previous sleep interval until the final sleep interval, whereupon the duration of the final sleep window is maintained and repeated. The final sleep window is determined using the parameters of Table 2 and is as follows.

$$\text{Final sleep window} = \text{Final sleep window base} * 2^{final\ window\ exponent} \quad \text{[Equation 1]}$$

During the listening window, if the MSS receives via the traffic indication message that there is traffic addressed to the MSS (S15), the MSS terminates sleep mode and returns to normal operation. After returning to normal operation, the MSS can receive the downlink traffic.

Figure 2:
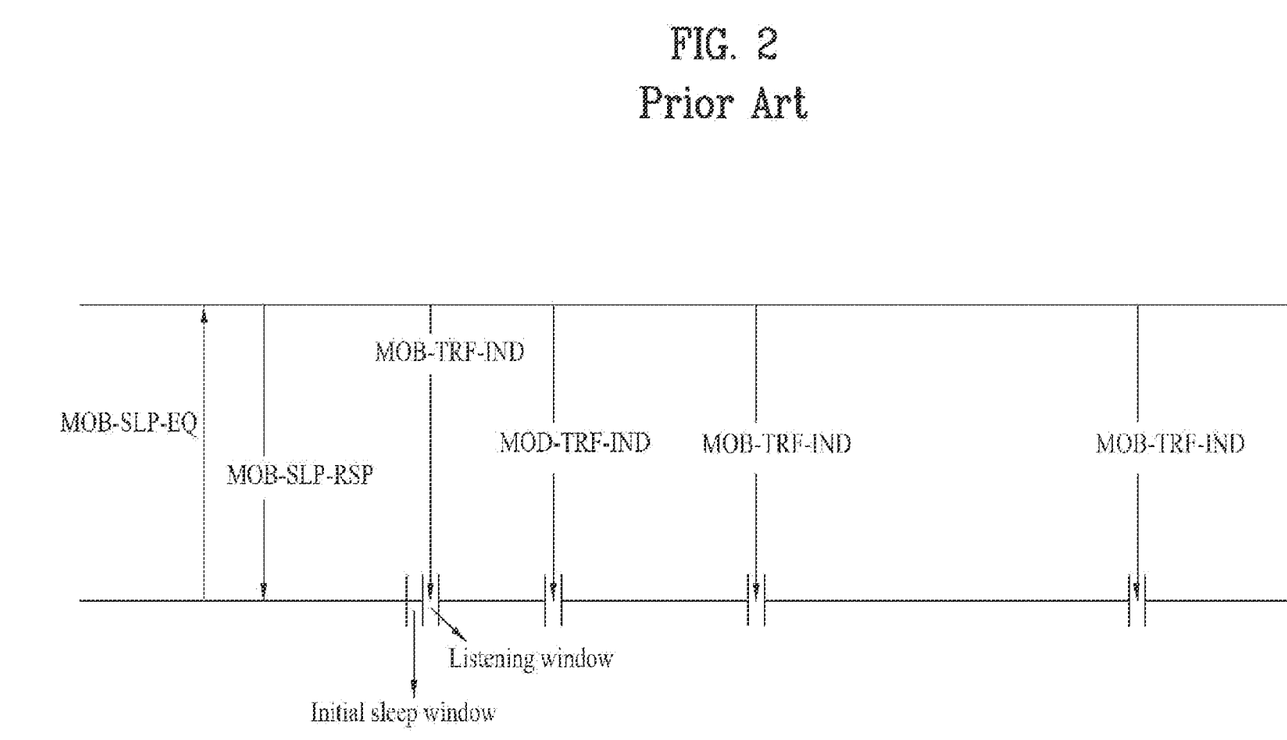
FIG. 2 illustrates an example of sleep interval increasing at a specified rate.

If the MSS returns and remains in sleep mode, the sleep window is twice as long as the previous sleep window. In the subsequent listening window, if there is no downlink traffic addressed to the MSS, and as a result, the MSS returns to sleep mode, again, the duration of sleep interval is twice is long as the previous sleep window. In other words, the sleep window increases at a specified amount, e.g., two times or double, after the MSS returns to sleep mode after each listening window. This is illustrated in FIG. 2.

Figure 3:
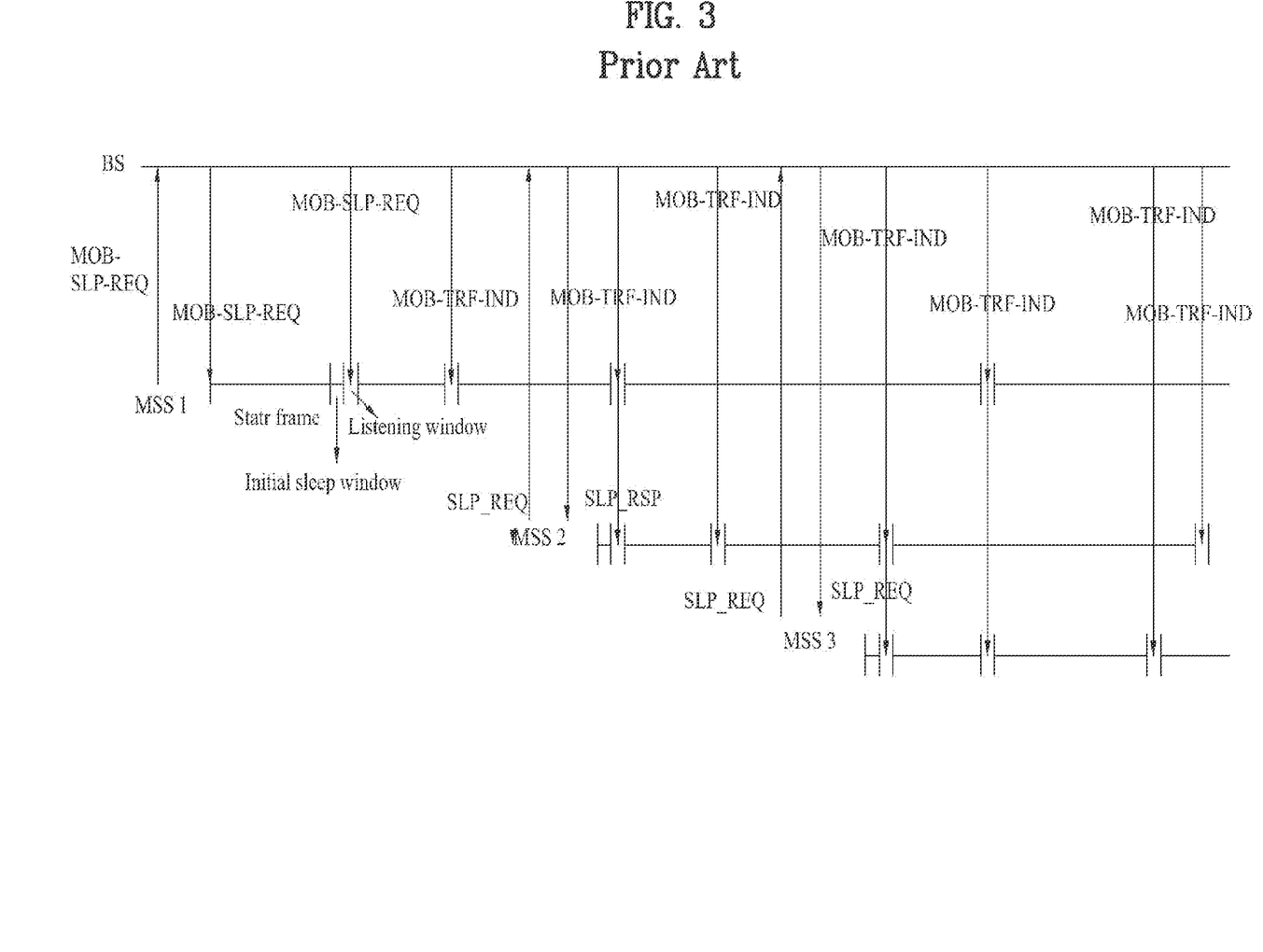
FIG. 3 is an example of at least two MSSs renewing sleep interval after entering sleep mode.

FIG. 3 is an example of at least two MSSs updating sleep window after entering sleep mode. As illustrated in FIG. 3, if a plurality of MSSs enter sleep mode, there can be numerous listening windows which do not correspond with each other since the MSSs likely enter sleep mode at different times. Consequently, the BS broadcasts the traffic indication messages at every listening window, resulting in increasing number of broadcasts as the number of MSSs increases. Evidently, the problem with this is that the traffic indication message is broadcasted at each and every listening window and with the increase of MSSs, a number of listening windows corresponding to each MSS increases, resulting in increasing number of broadcasts.

In addition, with increasing number of broadcasts, the amount of transmitted data also increases for a MSS. More specifically, the length of the traffic indication message transmitted to a MSS, which is in sleep mode, can become long.

DISCLOSURE OF INVENTION

Accordingly, the present invention is directed to a method of supporting operation of sleep mode in a wireless radio access system that substantially obviates one or more problems due to limitations and disadvantages of the related art.

An object of the present invention is to provide a method of supporting operation of sleep mode in a wideband communication system.

Another object of the present invention is to provide synchronizing starting points of listening windows of at least one mobile subscriber station.

A further object of the present invention is to provide a way to reduce a length of a traffic indication message.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of supporting operation of sleep mode in a wideband communication system. The method includes determining a frame offset information for synchronizing listening windows of at least one mobile subscriber station (MSS) in sleep mode and transmitting the determined frame offset information to at least one MSS.

In another aspect of the present invention, a method of supporting operation of sleep mode in a wideband communication system is introduced. The method includes receiving a determined frame offset information for synchronizing a listening window of at least one mobile subscriber station (MSS), and adjusting a starting point of at least one listening window based on the determined frame offset information.

In another aspect of the present invention, a method of supporting operation of sleep mode in a wideband communication system is introduced. The method includes transmitting a sleep response message which includes information related to granting a mobile subscriber station sleep (MSS) to enter sleep mode, and transmitting to the MSS information related to a starting point of a subsequent listening window during a current listening window, wherein the starting point of the subsequent listening window has been synchronized with a starting point of a listening window of at least one other MSS.

In another aspect of the present invention, a method of indicating downlink traffic to a mobile subscriber station (MSS) that is in sleep mode includes the MSS which transmits a sleep request message to a base station (BS) and enters sleep mode by receiving a sleep response message from the BS, wherein the sleep response message includes a sleep identifier (SLPID). Furthermore, the method includes receiving a traffic indication message from the BS at a specified time, and determining whether a SLPID included in the traffic indication message is same as the SLPID included in the sleep response message by the MSS. In addition, the method includes the MSS which terminates sleep mode if the SLPID in the traffic indication message is same as the SLPID included in the sleep response message.

In another aspect of the present invention, a method of indicating downlink traffic to a mobile subscriber station (MSS) that is in sleep mode is introduced. In detail, a base station (BS) receives a sleep request message from the MSS, and grants the MSS to enter sleep mode by transmitting a sleep response message, wherein the sleep response message includes a sleep identifier (SLPID). Furthermore, the BS transmits at a specified time a traffic indication message to at least one MSS, wherein the traffic indication message includes a SLPID for a specific MSS.

It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

In an embodiment of the present invention, a method of achieving more efficient sleep mode operation is introduced. More specifically, by reducing a number of traffic indication message transmissions broadcasted to mobile subscriber stations, more efficient use of sleep mode can be achieved. To reduce the number of traffic indication message transmissions, listening windows between mobile subscriber stations in sleep mode can be synchronized. Synchronization of listening windows can be accomplished by adjusting a frame offset value of a mobile subscriber station (MSS) in a sleep mode.

Figure 4A:
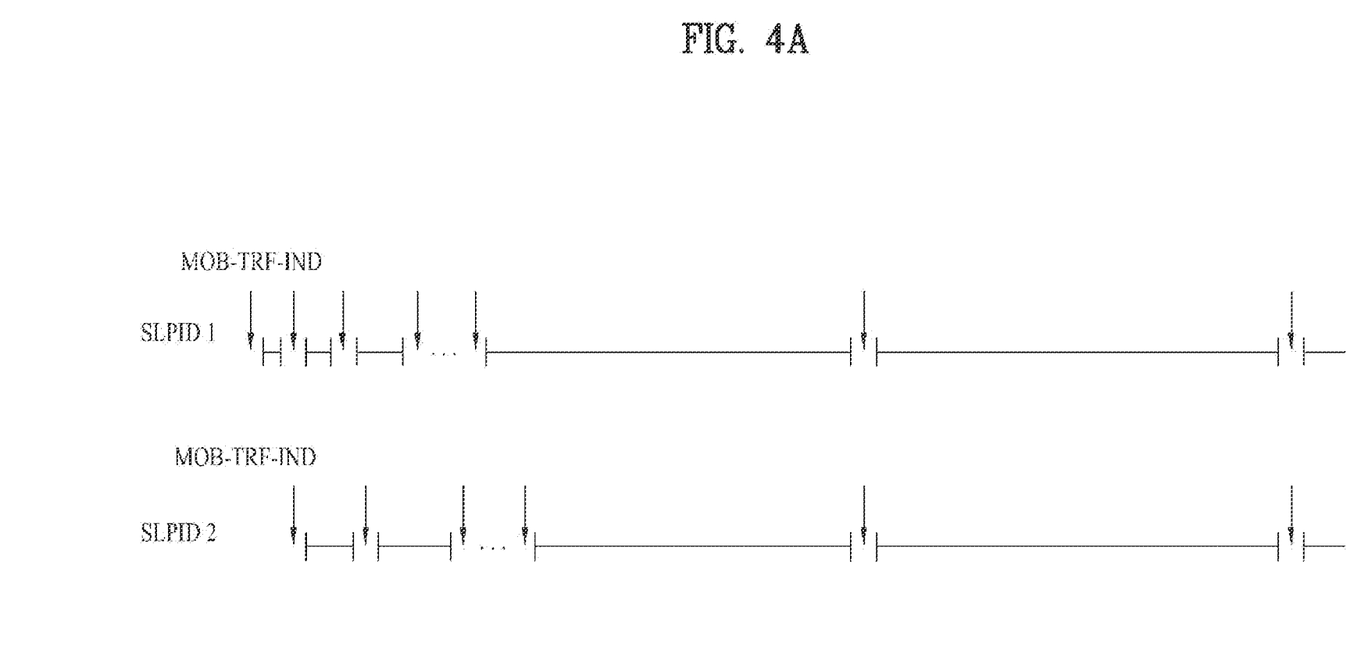
FIG. 4a is an example illustrating a MSS having sleep identification (SLPID) '1' and a MSS having sleep identification '2'.
Figure 4B:
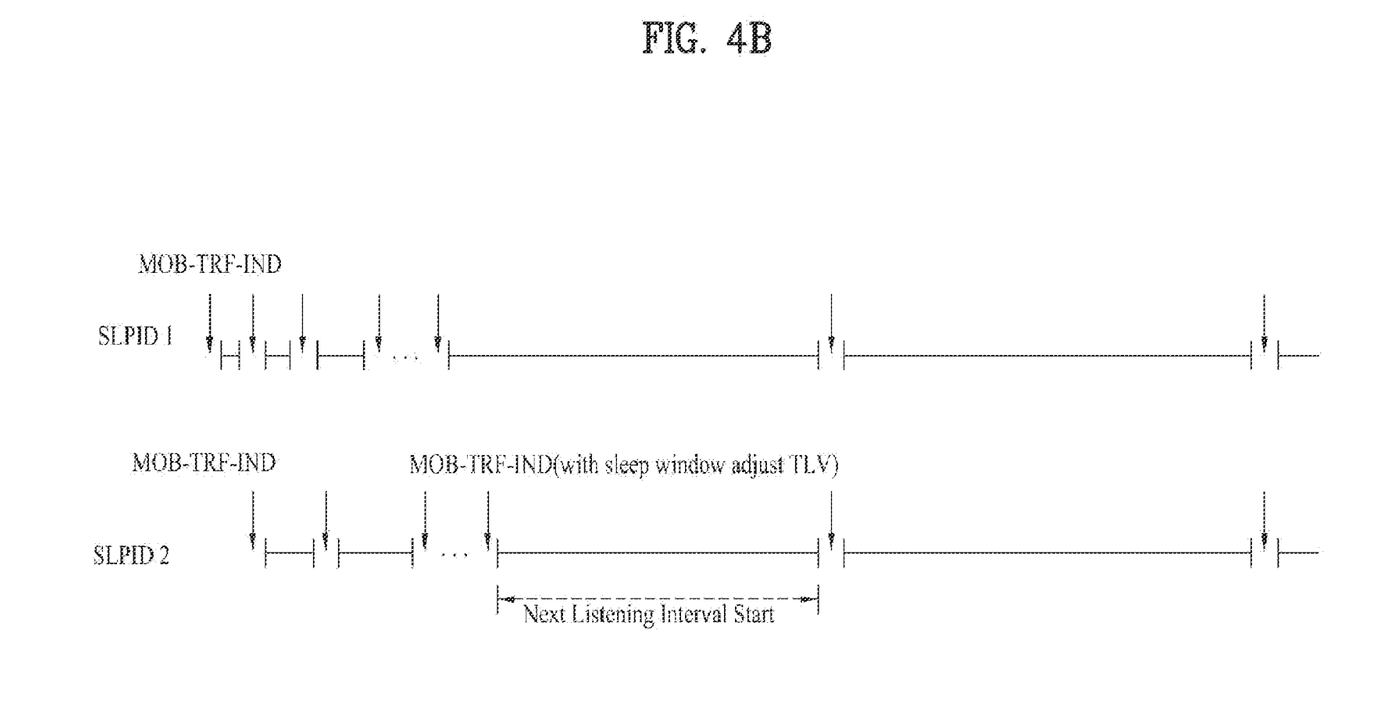
FIG. 4b is an example illustrating each MSS independently receiving traffic indication message and at a certain point.

FIG. 4a is an example illustrating a MSS having sleep identification (SLPID) '1' and a MSS having sleep identification '2', each independently receiving traffic indication message from a base station (BS) during listening window. On the other hand, FIG. 4b is an example illustrating each MSS independently receiving traffic indication message and at a certain point, a BS adjusts a listening window of the MSS having SPLID '2' to synchronize with a listening window of the MSS having SPLID '1'. Consequently, the BS broadcasts one traffic indication message to all mobile subscriber stations resulting in reduced downlink traffic load.

Figure 5:
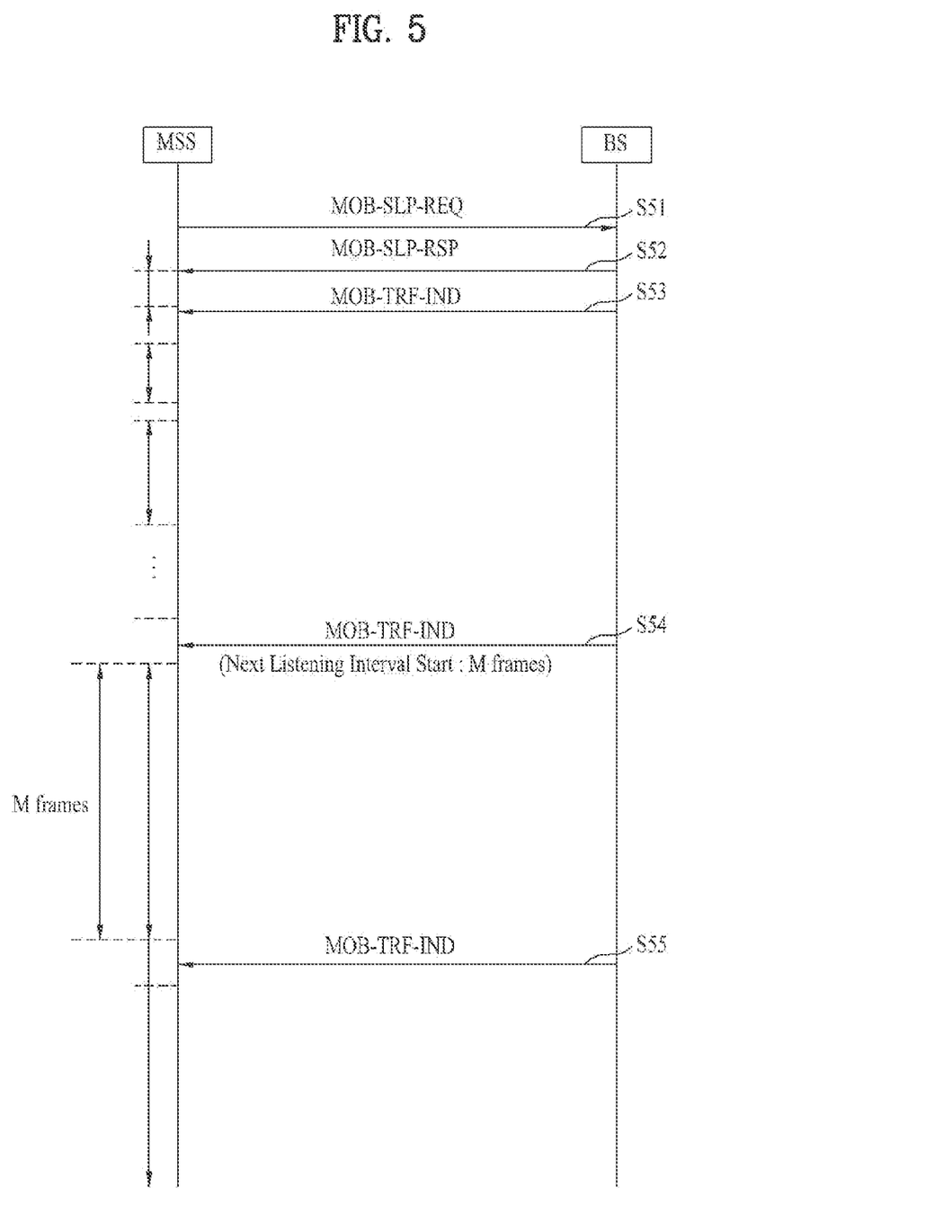
FIG. 5 is an example illustrating a process of communication between a base station and a mobile subscriber station in relation to an embodiment of the present invention.

FIG. 5 is an example illustrating communication between a BS and a MSS. In FIG. 5, a MSS transmits a sleep request message (MOB-SLP-REQ) to a BS to request for permission to enter sleep mode (S51). In response, the BS transmits a sleep response message (MOB-SLP-RSP), which includes information such as an initial sleep window, a sleep mode entry point, and a final sleep window, to the MSS (S52).

If the downlink traffic from the BS does not include any messages addressed to the MSS, the MSS returns to sleep mode. However, before returning to sleep mode, the size or duration of sleep window is increased at a specified rate by using a sleep window update algorithm. For example, a subsequent sleep window is twice the size or longer than the previous sleep window. In addition, the MSS receives a traffic indication message (MOB-TRF-IND) broadcasted from the BS during the listening window (S53, S54). The MOB-TRF-IND message can have the same data structure as shown in Table 6, for example.

In order to synchronize transmission of the MOB-TRF-IND messages of a plurality of MSSs, a frame offset should be determined of at least one MSS. The frame offset can be determined by synchronizing a listening window of a MSS with a listening window of another MSS.

In operation, there are two types of methods through which to synchronize listening windows of a plurality of mobile subscriber stations which are in sleep mode. The first method relates to unifying start of listening windows of mobile subscriber stations. In detail, by setting as a reference point a start of listening window of a MSS, a frame offset can be fixed to a start of listening window of another mobile subscriber station.

The second method also relates to synchronizing start of listening windows of mobile subscriber stations. Here, the BS adjusts the frame offsets so that the starts of listening windows of mobile subscriber stations are in sync.

After the BS determines a frame offset for synchronizing listening windows of all mobile subscriber stations in sleep mode, information related to the frame offset is transmitted to each MSS.

As illustrated in FIG. 5, the frame offset information can be transmitted via the MOB-TRF-IND message, which is broadcasted to the listening windows from the BS. Furthermore, the transmission type of the frame offset can include Type Length Value (TLV) type parameter, as depicted in Table 3 (S54). However, the transmission type of the frame offset can be expressed in different ways and is not limited to scheme of Table 3.

TABLE 3

| Name | Type | Length | Value |
| --- | --- | --- | --- |
| Listening Time Adjust | 2 | Variable | Compound |

Here, Table 3 indicates listening time adjust information in a "compound" format which includes variable length.

The BS then transmits to the MSS the frame offset information along with identifications (IDs) to identify each MSS. As for the type of ID that can be used include sleep ID (SLPID) or basic connection ID (CID), for example. The SLPID is assigned by the BS to the MSS via MOB-SLP-RSP message when the MSS enters sleep mode. Consequently, the SLPID is unique to each MSS in sleep mode. On the other hand, the basic CID is an ID which is allocated to each and every MSS that communicates with the BS. Usually, the basic CID is allocated the first time the MSS establishes connection with the BS.

The following Table 4 shows a data type which is included in the MOB-TRF-IND message when SLPID is used. Table 5 shows a data type when the basic connection ID is used. Table 4 and Table 5 illustrate examples of data types used but are not limited to these types and other data types can be used.

TABLE 4

| Name | Type | Length | Value |
|---|---|---|---|
| SLPID | 2.1 | 2 | Unique identifier used in Sleep Mode |
| Next Listening Window Start | 2.2 | 3 | Start frame to next listening window |

TABLE 5

| Name | Type | Length | Value |
|---|---|---|---|
| Basic CID | 2.3 | 2 | The Basic CID of the MSS |
| Next Listening Window Start | 2.2 | 3 | Start frame to next listening window |

The MSS ascertains whether there is any downlink traffic having its own address through the traffic indication message from the BS during the listening window. If there is no downlink traffic directed to the MSS, the MSS verifies whether or not a frame offset information is included in the message. If the frame offset information is included in the traffic indication message, the MSS determines whether the SLPID corresponding to the MSS or a basic CID is included in the message (S54).

Although either the SLPID or the basic CID can be included in the message, using the SLPID has advantages over using the basic CID. In particular, the SLPID requires less number of bits. The SLPID uses 10 bits where as the basic CID uses 12 bits. The details of using SLPID in the traffic indication message is further described below as another embodiment of the present invention.

Figure 6:
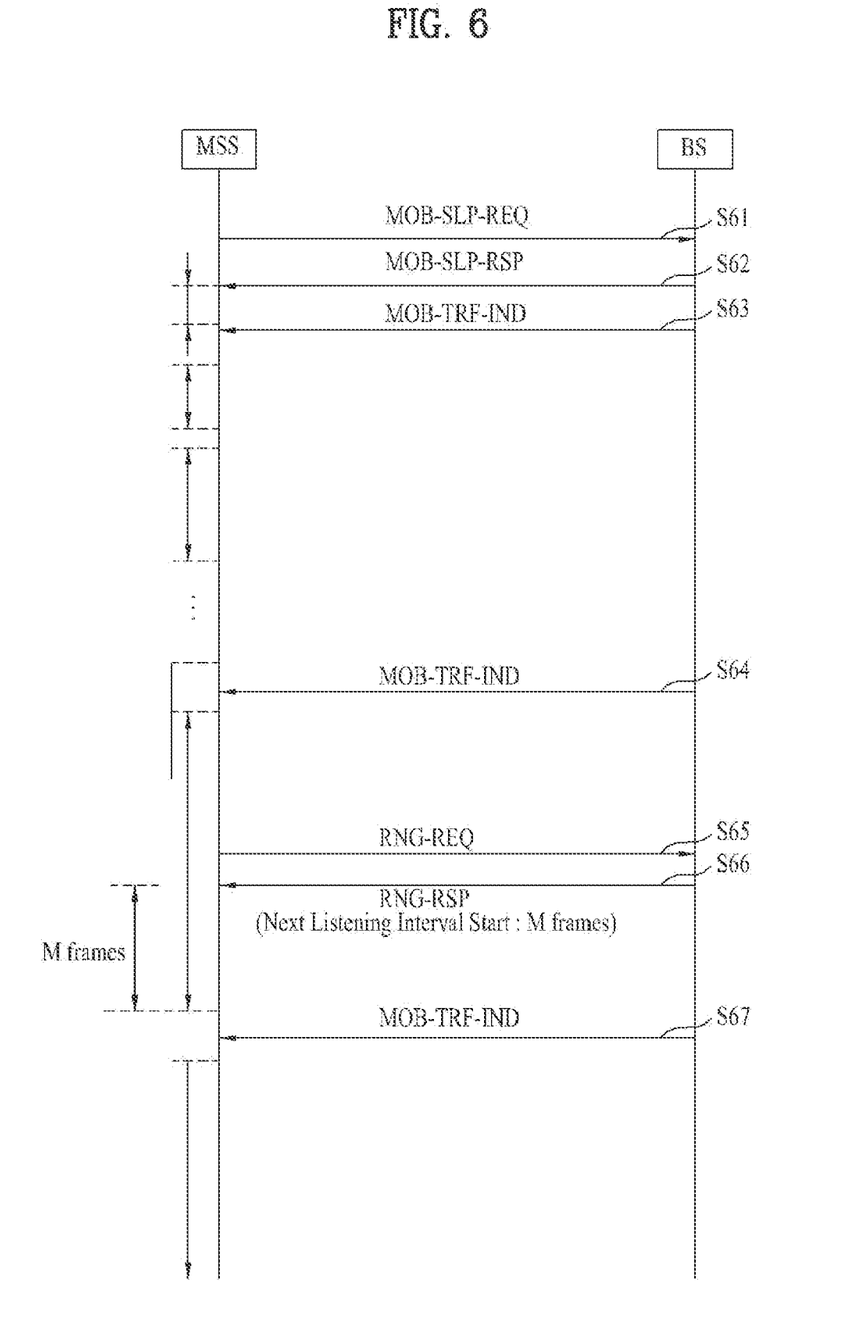
FIG. 6 is an example illustrating transmitting a ranging response message by including information such as frame offset information, a SLPID, or a basic CID.

FIG. 6 is an example illustrating transmitting a ranging response message by including information such as frame offset information, a SLPID, or a basic CID. According to FIG. 6, a MSS sends a sleep request (MOB-SLP-REQ) message to a BS (S61). The BS then sends a sleep response (MOB-SLP-RSP) message to the MSS in response (S62). In the sleep response message, information such as an initial sleep window, a start of sleep mode, listening window, and a final sleep window are included.

Thereafter, the MSS increases the sleep window at a specified rate according to the sleep window update algorithm. The MSS also receives traffic indication (MOB-TRF-IND) messages during the listening window to determine whether any downlink traffic exists (S63, S64). When there is no downlink traffic, the MSS continues sleep mode.

The MSS in sleep mode transmits a ranging request (RNG-REQ) message to the BS in order to perform periodic ranging operation (S65). The periodic ranging operation is necessary for maintaining uplink transmission. More specifically, the ranging operation controls parameter values, such as timing offset and power, in case an uplink transmission of data from the MSS to BS becomes necessary. To this end, the MSS in sleep mode performs ranging operation by periodically transmitting ranging request messages to the BS.

After receiving the ranging request message from the MSS, the BS returns a ranging response (RNG-RSP) message to the MSS (S66). It is possible for the BS to decide to synchronize traffic indication messages of a first MSS in sleep mode with other MSSs in sleep mode by adjusting the start of next listening window of the first MSS in sleep mode with next listening window starting points of the other MSSs in sleep mode. To accomplish this, the uplink transmission parameter adjusted value and a parameter which includes frame offset information of each MSS and identifications of the corresponding MSS are included in the ranging response message from the BS to the MSS.

In other words, the BS can set a frame offset value of starting point of a listening window and transmits the frame offset value along with the SPLID or the basic CID of the MSS seeking to adjust the starting point of the listening window. The MSS determines whether frame offset information is included in the sleep response message upon receipt. If the frame offset information is included in the sleep response message, the MSS determines whether a SLPID or a basic CID corresponding to the MSS is included in the message.

If there no downlink traffic and no SPLID or basic CID having its address, the sleep window and the listening window are set according to the sleep window update algorithm, and the MSS continues sleep mode. However, if there is SPLID or basic CID having its address, the MSS remains in sleep mode until the next listening window, which is set based on the frame offset information, and thereafter receives a traffic indication message during the next listening window (S67). For adjusting the sleep window, it is possible to set a sleep window different from the sleep window set by the sleep window update algorithm. After a different sleep window is set, the sleep window does not have to be updated according to the adjusted sleep window, and instead, the sleep window can be adjusted according to a non-adjusted sleep window or updated according to the original sleep window.

As discussed above, a SPLID or a basic CID can be used by the BS to transmit message(s) to indicate whether there is downlink traffic addressed to a MSS having its SPLID or basic CID, respectively. In other words, the SLPID or the basic CID can be used to deliver existence of downlink traffic to a MSS that is in sleep mode.

In another embodiment of the present invention, a more efficient way of transmitting a message to indicate downlink traffic to the MSS can be discussed. More specifically, a SLPID can be used, instead of basic CID, to transmit a traffic indication message to the MSS that is in sleep mode.

Table 6 illustrates an example of a traffic indication message which is broadcasted from the BS to the MSS at specified interval(s). More specifically, Table 6 indicates whether downlink traffic exists having its address or what specific action to take by the MSS. The specific action includes, for example, updating SLPID and adjusting starting point(s) of listening window(s). Table 6 also includes a group indication bitmap which can have a fixed bit size of 32 bits.

As explained above, the MSS, which is in sleep mode, receives a traffic indication message during the listening window, and from the message, the MSS determines whether there is downlink traffic having its address. In other words, existence of downlink traffic is important in the MSS determining whether to remain in sleep mode or terminate sleep mode to receive downlink data.

TABLE 6

| Syntax | Size (bits) | Notes |
|---|---|---|
| MOB_TRF-IND Message Format ( ){ | | |
| Management message type = 52 | 8 | |
| FMT | 1 | 0 = SLPID Bitmap based format<br>1 = CID based format |
| if (FMT = 0){ | | |
| reserved | 7 | |
| SLPID Group Indication | 32 | $N_{th}$ bit of SLPID Group Indication Bitmap [most significant bit (MSB) |

TABLE 6-continued

| Syntax | Size (bits) | Notes |
|---|---|---|
| Bitmap | | corresponds to N = 0] is allocated to SLPID Group that includes MSSs with SLPID values from N*32 to N*32 + 31<br>Meaning of this bit<br>0: There is no traffic for all the 32 MSSs which belong to the SLPID Group<br>1: There is traffic for at least one MSS in SLPID Group |
| Traffic Indication Bitmap | variable | Traffic Indication Bitmap comprises the multiples of 32-bit long Traffic Indication Unit.<br>A Traffic Indication Unit for 32 SLPIDs is added to MOB_TRF-IND message whenever its SLPID Group is set to '1' 32 bits of Traffic Indication Unit (starting from MSB) are allocated to MSSs in the ascending order of their SLPID values<br>0: Negative Indication<br>1: Positive Indication |
| } else {<br>  Num-pos | 7 | Number of CIDs on the positive indication list |
| for (i=0; i<Num-pos; i++) {<br>  Short Basic CID | 12 | 12 least significant bits of the Basic CID |
| }<br>while (!(byte_boundary)){<br>  Padding bits | ≦7 | Padding for byte alignment |
| }<br>}<br>} | | |

If there is downlink traffic designated for the MSS, the MSS checks a 'sleep identification (SLPID) Group Indication Bitmap' to see whether there is any downlink traffic addressed to the SLPID Group to which the MSS belongs. If there is downlink traffic to its SLPID Group, the MSS checks a 'Traffic Indication Bitmap' to determine whether there is traffic for it to receive.

Further to information included in Table 6, the BS can use information of Table 7 in a traffic indication message to provide a MSS that is in sleep mode with information related to whether downlink traffic having its address exists or what type of specific action to take. Table 7 illustrates an example using SLPID bitmap. In Table 7, the indications are categorized in four types. The four types are as follows.

A SLPID bitmap value '00' indicates a command by the BS to the MSS to remain in sleep mode. A SLPID bitmap value '01' indicates a command by the BS to the MSS to terminate sleep mode immediately. A SLPID bitmap value '10' indicates a command by the BS to the MSS to re-enter sleep mode after a ranging operation. Lastly, a SLPID bitmap value '11' indicates a command by the BS to the MSS to terminate sleep mode after a ranging operation. Here, the sleep identification bitmap indicator is in 2 bits.

TABLE 7

| Syntax | Size (bits) | Notes |
|---|---|---|
| MOB_TRF-IND Message Format ( ){<br>  Management message | 8 | |
| type = 52 | | |
| FMT | 1 | 0 = SLPID Bitmap based format<br>1 = CID based format |
| if (FMT = 0){<br>  Byte of SLPID bitmap | 8 | |
| SLPID Bitmap | variable | Two bits are allocated to one MSS<br>00: No periodic ranging opportunity and no PDUs such as DL traffic<br>01: No periodic ranging, but PDU such as DL traffic<br>10: Periodic ranging opportunity and no PDUs such as MAC Management messages (the MSS may return to sleep mode after periodic ranging operation)<br>11: Periodic Ranging opportunity and PDUs such as MAC Management messages (the MSS shall maintain Awake mode after Periodic Ranging Operation) |
| NUM of MSS periodic ranging | 8 | |
| For (i=0; i<NUM of MSS Periodic Ranging; i++) {<br>  Ranging Frame Offset | 10 | Frame Offset for case where SLPID bit map indicator is set to '10 or '11' |
| }<br>} else {<br>  Num-pos | 7 | Number of CIDs on the positive indication list |
| for (i=0; i<Num-pos; i++) {<br>  Short Basic CID | 12 | Basic CID |
| }<br>while (!(byte_boundary)){<br>  Padding bits | 1 | Padding for byte alignment |
| }<br>}<br>} | | |

In order to provide the MSS with information related to existence of downlink traffic, the BS can use a SLPID bitmap or a short basic CID. If the basic CID is used, a lower 12 bits are used to transmit the message. With respect to bit usage of the basic CID, only the lower 12 bits out of 16 bits, leaving out the upper 4 bits are used by the BS. In addition, if the lower 12 bits of the basic CID is same, the BS cannot provide indication of downlink traffic to the MSS using the basic CID. Moreover, the disadvantage of using 12 bits of the basic CID over the 10 bits of SLPID is that the length of the traffic message is longer.

Alternatively, if the SLPID bitmap is used, two bits are allocated to each SLPID bitmap in order of the assignment of the SLPID. As such, depending on the number of MSSs, the length of bitmap can also increase correspondingly. Here, the SLPID can have a maximum value of 1024, which means that the maximum length of the SLPID bitmap is 1024*2=2048 bits. In other words, the SLPID bitmap has 256 bytes.

As explained above, traditionally, two methods are used to classify MSSs which are in sleep mode and provide indication of downlink traffic to corresponding MSS. The first method is to use the SLPID bitmap, and the other method includes using the basic CID of the MSS. However, as mentioned above, the problem with using the SLPID bitmap to provide indication of downlink traffic to the MSS, that is in sleep mode, is that the length of the traffic indication message can become long, especially, if there is a large number of MSSs. Furthermore, the problem of using the basic CID of the MSS is that the BS can only provide a message indicating existence of downlink traffic.

Table 8 is an example illustrating a traffic indication message (MOB-TRF-IND) according to the present embodiment. Table 8 represents using a SLPID to deliver to the MSS information such as whether there is downlink traffic addressed to it or which specific action to take by the MSS. As explained above, the specific action includes updating SLPID and adjusting starting points of listening windows, for example. Moreover, in Table 8, the traffic indication message includes information such as a Num-SLPID field and a SLPID field.

TABLE 8

| Syntax | Size (bits) | Notes |
|---|---|---|
| MOB_TRF-IND Message Format ( ){ | | |
|   Management message type = 52 | 8 | |
|   FMT | 1 | 0 = SLPID Bitmap based format<br>1 = SLPID based format |
|   if (FMT = 0){ | | |
|     Byte of SLPID bitmap | 8 | |
|     SLPID Bitmap | variable | Two bits are allocated to one MSS<br>00: No periodic ranging opportunity and no PDUs such as DL traffic<br>01: No periodic ranging, but PDU such as DL traffic<br>10: Periodic ranging opportunity and no PDUs such as MAC Management messages (the MSS may return to sleep mode after periodic ranging operation)<br>11: Periodic Ranging opportunity and PDUs such as MAC Management messages (the MSS shall maintain Awake mode after Periodic Ranging Operation) |
|   } else { | | |
|     Num_SLPID | 7 | Number of SLPIDs |
|     for (i=0; i<Num_SLPID; i++) { | | |
|       SLPID | 10 | |
|       Padding bits | 1 | Padding for byte alignment |
|     } | | |
|   } | | |
| } | | |

More specifically, Num-SLPID of 7 bits represents a number of SLPID, and a 10 bit SLPID represents an indication of downlink traffic or specific action of a MSS that is in sleep mode. Two bits are allocated to one MSS in SLPID. For example, a SLPID bitmap value '00' indicates no periodic ranging opportunity and no protocol data unit (PDU) such as downlink traffic. Furthermore, a SLPID bitmap value of '01' represents PDUs such as downlink traffic but no periodic ranging. A SLPID bitmap value of '10' represents periodic ranging opportunity but no PDUs such as Medium Access Control (MAC) management messages. Here, the MSS may return to sleep mode after periodic ranging operation. Lastly, a SLPID bitmap value of '11' represents a periodic ranging opportunity as well as PDUs such as MAC management messages. Here, the MSS should maintain awake mode after a periodic ranging operation. Furthermore, a ranging frame offset field indicates a frame offset where the SLPID bitmap value is set to '10' or '11.'

By using such a two bit allocation format, a length of the traffic indication message can be reduced. For instance, if an operational instruction is addressed to MSSs which are to terminate sleep mode and enter a listening window, the BS can use a 10 bit SLPID instead of a 12 bit short basic CID, reducing the length by two bits per each MSS.

Alternatively, if a periodic ranging is instructed, the BS uses a SLPID instead of a SLPID bitmap to reduce the length of a traffic indication (MOB-TRF-IND) message.

For example, assume that a BS instructs a MSS having SLPID=1023 to perform periodic ranging operation. Here, according to a traditional scheme whereby SLPID bitmap is used, the BS would need a SLPID bitmap length corresponding to 2*1024=2048 bits=256 bytes in order to instruct a MSS. Moreover, as indicated in Table 8, a length of the traffic indication (MOB-TRF-IND) message is 8+1+8+2048+8+10+5 (padding)=2088 bits=261 bytes.

However, if a SLPID is used to directly notify a MSS the operational instruction according to the embodiment of the present invention, as indicated in Table 8, a total length of the traffic indication (MOB-TRF-IND) message may be 8+1+7+10+2+8+10+2 (padding)=6 bytes.

As explained above, the BS can use a basic CID or a SLPID to transmit operational instruction(s) to the MSS. The basic CID uses 12 least significant bits, and the SLPID uses 10 bits. By using the SLPID over the basic CID, the length of the bits can be reduced by two bits for each MSS.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed:

1. A method of indicating downlink traffic to a mobile subscriber station (MSS) that is in a sleep mode, the method comprising:
   transmitting a sleep request (MOB-SLP-REQ) message to a base station (BS);
   entering the sleep mode in response to a sleep response (MOB-SLP-RSP) message received from the BS, wherein the sleep response message includes a first sleep identifier (SLPID);
   receiving a traffic indication (MOB-TRF-IND) message comprising a format (FMT) field indicating formats for the traffic indication message from the BS during a listening interval of the sleep mode, wherein the FMT field indicates that an SLPID bitmap based format or an SLPID based format is used for configuring the traffic indication message, and the traffic indication message further comprises a second SLPID, but not an SLPID bit-map when the SLPID based format is indicated by the FMT field;
   determining whether the second SLPID included in the traffic indication message is same as the first SLPID included in the sleep response message when the SLPID based format is used; and
   terminating the sleep mode to receive the downlink traffic when the second SLPID in the traffic indication message is same as the first SLPID included in the sleep response message, or
   re-entering a sleep window of the sleep mode when the second SLPID included in the traffic indication message is different from the first SLPID included in the sleep response message.

2. The method of claim 1, wherein the first SLPID and second SLPID have unique values within coverage of the BS and the first SLPID is assigned by the BS when the MSS enters the sleep mode.

3. The method of claim 1, wherein the traffic indication message includes a number of positive SLPIDs.

4. The method of claim 1, wherein a length of each of the first SLPID and the second SLPID is 10 bits.

5. A mobile subscriber station (MSS) for receiving an indication of downlink traffic in a sleep mode, the MSS comprising:
- a transmission module; and
- a reception module, wherein the MSS is configured to:
transmit a sleep request (MOB-SLP-REQ) message to a base station (BS);
enter the sleep mode in response to a sleep response (MOB-SLP-RSP) message received from the BS, wherein the sleep response message includes a first sleep identifier (SLPID);
receive a traffic indication (MOB-TRF-IND) message comprising a format (FMT) field indicating formats for the traffic indication message from the BS during a listening interval of the sleep mode, wherein the FMT field indicates that an SLPID bitmap based format or an SLPID based format is used for configuring the traffic indication message, and the traffic indication message further comprises a second SLPID, but not an SLPID bit-map when the SLPID based format is indicated by the FMT field;
determine whether the second SLPID included in the traffic indication message is same as the first SLPID included in the sleep response message when the SLPID based format is used; and
terminate the sleep mode to receive the downlink traffic when the second SLPID in the traffic indication message is same as the first SLPID included in the sleep response message, or
re-enter a sleep window of the sleep mode when the second SLPID included in the traffic indication message is different from the first SLPID included in the sleep response message.

6. The mobile subscriber station of claim 5, wherein the first SLPID and second SLPID have unique values within coverage of the BS and the first SLPID is assigned by the BS when the MSS enters the sleep mode.

7. The mobile subscriber station of claim 5, wherein the traffic indication message includes a number of positive SLPIDs.

8. The mobile subscriber station of claim 5, wherein a length of each of the first SLPID and the second SLPID is 10 bits.

* * * * *